United States Patent [19]

Mo

[11] Patent Number: 6,113,544

[45] Date of Patent: Sep. 5, 2000

[54] METHOD AND APPARATUS FOR AUTOMATIC TRANSMIT WAVEFORM OPTIMIZATION IN B-MODE ULTRASOUND IMAGING

[76] Inventor: Larry Y. L. Mo, 1707 Saratoga Rd., Waukesha, Wis. 53186

[21] Appl. No.: 09/206,657

[22] Filed: Dec. 7, 1998

[51] Int. Cl.[7] .................................................. A61B 08/00
[52] U.S. Cl. ........................................... 600/447; 600/443
[58] Field of Search ..................................... 600/443, 444, 600/447, 448, 449

[56] References Cited

U.S. PATENT DOCUMENTS

| | | | |
|---|---|---|---|
| 5,551,433 | 9/1996 | Wright et al. ............................ | 600/443 |
| 5,873,830 | 2/1999 | Hossack et al. ......................... | 600/447 |
| 5,879,303 | 3/1999 | Averliou et al. ......................... | 600/447 |

*Primary Examiner*—William E. Kamm
*Assistant Examiner*—Maulin Patel
*Attorney, Agent, or Firm*—Dennis M. Flaherty; Christian G. Cabou; Phyllis Y. Price

[57] ABSTRACT

A method and an apparatus for automating the B-mode transmit waveform center frequency/length adjustment based on actual image data. The average SNR and the spatial correlation statistics in selected kernels of the image data are analyzed to test if high-quality signal is present. By placing one or more of the test kernels at relatively great depth (i.e., close to the bottom of the user-selected image depth range), the overall test results indicate the highest-resolution transmit waveform that can be used, while providing a sufficiently strong signal down to the desired depth.

34 Claims, 4 Drawing Sheets

6,113,544

METHOD AND APPARATUS FOR AUTOMATIC TRANSMIT WAVEFORM OPTIMIZATION IN B-MODE ULTRASOUND IMAGING

FIELD OF THE INVENTION

This invention generally relates to B-mode imaging of biological tissues. In particular, the invention relates to methods for optimizing a B-mode ultrasound image by adjusting the transmit pulse sequence based on computerized analysis of image data.

BACKGROUND OF THE INVENTION

Conventional ultrasound imaging systems comprise an array of ultrasonic transducer elements which are used to transmit an ultrasound beam and then receive the reflected beam from the object being studied. Such scanning comprises a series of measurements in which the focused ultrasonic wave is transmitted, the system switches to receive mode after a short time interval, and the reflected ultrasonic wave is received, beamformed and processed for display. Typically, transmission and reception are focused in the same direction during each measurement to acquire data from a series of points along an acoustic beam or scan line. The receiver is dynamically focused at a succession of ranges along the scan line as the reflected ultrasonic waves are received.

For ultrasound imaging, the array typically has a multiplicity of transducer elements arranged in one or more rows and driven with separate voltages. By selecting the time delay (or phase) and amplitude of the applied voltages, the individual transducer elements in a given row can be controlled to produce ultrasonic waves which combine to form a net ultrasonic wave that travels along a preferred vector direction and is focused at a selected point along the beam. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. In the case of a steered array, by changing the time delays and amplitudes of the applied voltages, the beam with its focal point can be moved in a plane to scan the object. In the case of a linear array, a focused beam directed normal to the array is scanned across the object by translating the aperture across the array from one firing to the next.

The same principles apply when the transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting separate time delay (and/or phase shifts) and gains to the signal from each receiving transducer element.

An ultrasound image is composed of multiple image scan lines. A single scan line (or small localized group of scan lines) is acquired by transmitting focused ultrasound energy at a point in the region of interest, and then receiving the reflected energy over time. The focused transmit energy is referred to as a transmit beam. During the time after transmit, one or more receive beamformers coherently sum the energy received by each channel, with dynamically changing phase rotation or delays, to produce peak sensitivity along the desired scan lines at ranges proportional to the elapsed time. The resulting focused sensitivity pattern is referred to as a receive beam. A scan line's resolution is a result of the directivity of the associated transmit and receive beam pair.

In B-mode ultrasound imaging, two-dimensional images of tissue are created in which the brightness of a pixel is based on the intensity of the echo return. The outputs of the beamformer channels are coherently summed to form a respective pixel intensity value for each sample volume in the object region or volume of interest. These pixel intensity values are log-compressed, scan-converted and then displayed as an image of the anatomy being scanned.

In B-mode ultrasound imaging, the signal-to-noise ratio (SNR) is a key measure of image quality. A higher SNR often implies increased penetration at a given imaging frequency. Alternatively, SNR can be traded off for improved resolution by imaging at higher frequency. Conventional ultrasound scanners often support two or more user-selectable transmit frequencies for B-mode imaging. Higher frequencies can be used for the "easy" patient type for maximum resolution, whereas lower frequencies are used to achieve better penetration for the "difficult" patient type. The different transmit frequency waveforms may also differ in the number of pulses or burst length. Generally longer burst lengths (increased dosage) are used to obtain better penetration at the expense of resolution. The preset or default transmit frequency for a given probe is usually chosen based on application type. In practice, however, the patient-to-patient variations are so great that the preset transmit frequency will not always be optimal.

While state-of-the-art scanners provide the user with selectable imaging parameters such as transmit frequency, acoustic output, TGC curve, dynamic range and frame averaging level, all of which can significantly affect B-mode sensitivity and penetration, the sonographer usually does not have the time (or training) to fully optimize all these controls. If the patient appears difficult to scan, the sonographer may resort quickly to the lowest transmit frequency, or switch to a lower frequency probe or to a different machine. On the other hand, if the current scan is acceptable, the user may not bother to select a higher transmit frequency for better resolution. To improve the ease-of-use and efficiency of the scanner, there is a need to automate selection of some of the basic imaging parameters based on the actual image data.

SUMMARY OF THE INVENTION

The present invention is a method and an apparatus for automating the B-mode transmit waveform adjustment, including its center frequency and/or total pulse length, based on actual image data. The method comprises the steps of analyzing the average SNR and spatial correlation statistics in selected kernels of the image data to test if high-quality signal is present. By placing one or more of the test kernels at relatively great depth (i.e., close to the bottom of the user-selected image depth range), the overall test results indicate the highest-resolution transmit waveform that can be used, while providing a sufficiently strong signal down to the desired depth.

Conventional imagers typically provide no more than three transmit frequency choices for selection by the user. Each transmit frequency setting denotes a set of transmit waveforms for different focal zones. The average duration (period) of a cycle within a given waveform determines its center frequency. For a fixed voltage drive, the total energy (dosage) is proportional to the length or total number of pulses within the transmit waveform. With the automated transmit method of this invention, the optimal transmit waveform set can be selected from broader ranges of transmit waveform frequency and length (i.e., number of pulses). Hence, the automated transmit method can potentially transmit waveforms that are better tailored to each particular patient's body, thereby achieving image quality that is not possible with conventional scanners.

In accordance with the preferred embodiment of the invention, the automatic transmit waveform (pulse sequence) adjustment method uses a noise model of the entire B-mode processing chain from the beamformer through the B-mode processor to the back-end video processor. Basically the noise model utilizes the fact that the primary noise source in a digital scanner lies in the front-end electronics (pre-amplifier), which can be modeled as white Gaussian noise whose RMS amplitude can be calibrated accurately (for normal operating temperature). Thus, by incorporating knowledge of the exact system bandwidths and gains at various points in the signal processing path, and of the display dynamic range setting and video gray mapping, the noise model can be used to predict the exact noise statistics (mean and probability distribution) in the B-mode image for any front-panel gain setting.

In accordance with the preferred embodiments, an image is frozen to allow a current image frame to be saved in cine memory, which can then be read out by the host computer for analysis. The host computer retrieves the current settings of all pertinent gain, receive aperture and display parameters for a number of test kernels within the image. A noise model is used to predict the average noise level in each kernel. For each kernel, the host computer then calculates the average (or total) pixel intensity and compares that to the predicted average (or total) noise, which gives a measure of the average SNR. Signal is deemed present in a kernel if its average display pixel intensity is significantly above the predicted average noise level. Otherwise the kernel is considered to contain only noise and is discarded. For each kernel whose average SNR is above a minimum acceptable threshold, the lateral spatial autocorrelation function is computed for every horizontal row (for a linear scan) or for every arc (for sector scan) of pixels. These values are then averaged to obtain a lateral spatial correlation estimate, the width of which is compared with a theoretical value based on the expected point spread function (PSF) in the kernel. If the transmit beam is corrupted/defocused by phase-aberrating body wall layers, the spatial correlation function estimate in the various test kernels should show a width that is significantly larger than that of the theoretical PSF.

In accordance with an alternative preferred embodiment, each horizontal row of pixel intensities can be transformed and analyzed in the spatial frequency domain.

Based on the foregoing analyses, the host computer then gages the image quality in each test kernel. Based on the combined image quality rating for all test kernels, the most suitable transmit waveform set (for different transmit focal zones) is selected from a table of optimal transmit waveform sets.

DETAILED DESCRIPTION OF THE PREFERRED EMBODIMENTS

Figure 1:
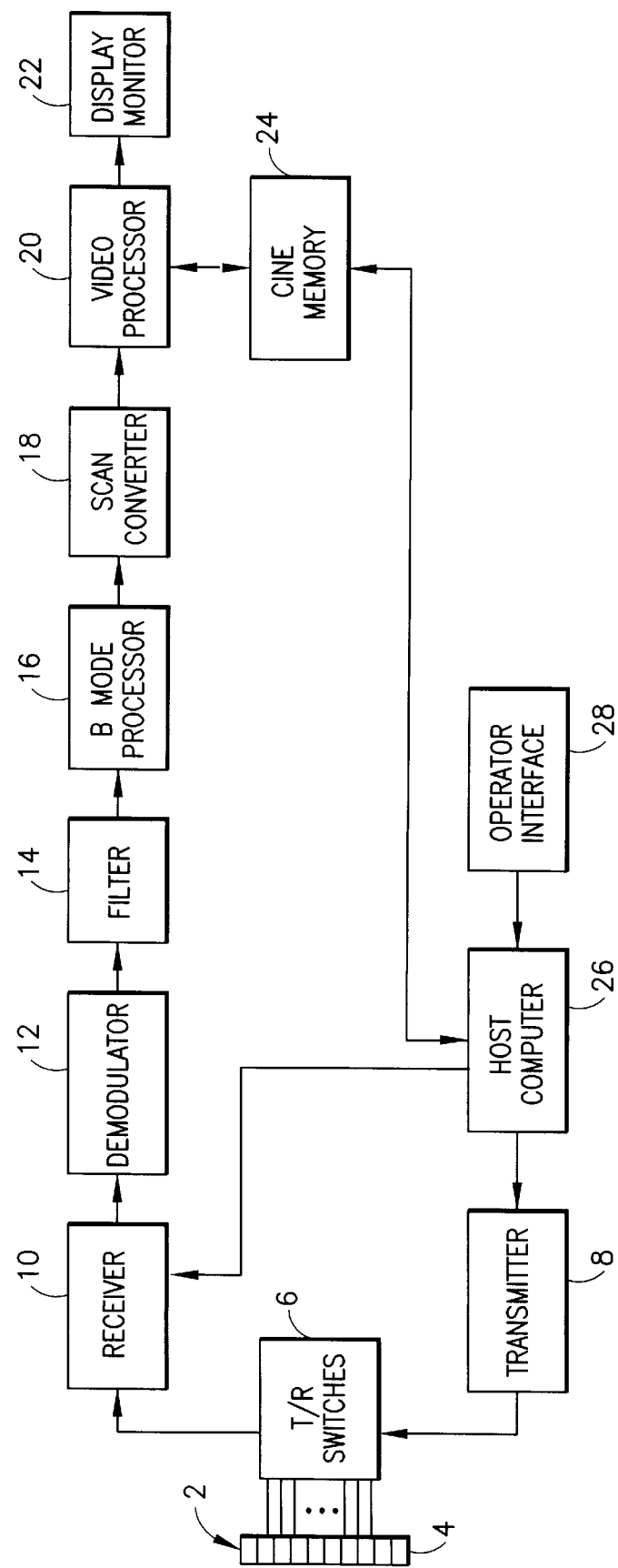
FIG. 1 is a schematic showing a block diagram of an ultrasound imaging system in accordance with the preferred embodiments of the invention.

An ultrasound imaging system in accordance with one preferred embodiment of the invention is generally depicted in FIG. 1. The system comprises a transducer array 2 consisting of a plurality of separately driven transducer elements 4, each of which produces a burst of ultrasonic energy when energized by a pulsed waveform produced by a transmitter 8. The ultrasonic energy reflected back to transducer array 2 from the object under study is converted to an electrical signal by each receiving transducer element 4 and applied separately to a receiver 10 through a set of transmit/receive (T/R) switches 6. The T/R switches 6 are typically diodes which protect the receive electronics from the high voltages generated by the transmit electronics. The transmit signal causes the diodes to shut off or limit the signal to the receiver. Transmitter 8 and receiver 10 are operated under control of a host computer (i.e., master controller) 26. A complete scan is performed by acquiring a series of echoes in which transmitter 8 is gated ON momentarily to energize each transducer element 4 in the transmit aperture, and the subsequent echo signals produced by each transducer element 4 are applied to receiver 10. The receiver 10 combines the separate echo signals from each transducer element to produce a single echo signal which is used to produce a line in an image on a display monitor 22.

The receiver's signal inputs are the low-level analog RF signals from the transducer elements. The receiver is responsible for analog-to-digital conversion and for receive beamforming. In baseband imaging systems, the beamsummed signal is output to a demodulator 12, which converts the beamsummed signal into baseband in-phase I and quadrature Q receive beams. The I and Q acoustic data vectors from the demodulator 12 are sent to respective FIR filters 14 which are programmed with filter coefficients to pass a band of frequencies preferably centered at the fundamental frequency $f_0$ of the transmit waveform or a (sub)harmonic frequency thereof.

Vectors of I and Q acoustic data are optionally subject to a TGC/LGC block (not shown, but usually located between the receiver and the filter), which provides time gain and/or lateral gain compensation. Time gain compensation fine tunes the image in the axial direction by increasing or decreasing gain as a function of depth (time) for all received vectors. Lateral gain compensation fine tunes the image in the lateral direction by increasing or decreasing gain as a function of lateral position (beam or vector position). In the former case, gain is controlled in small rows of the image. In the latter case, gain is controlled in small sectors of the image.

After TGC/LGC, the acoustic data is sent to a B-mode processor 16, which converts the I and Q acoustic data into a log-compressed version of the signal envelope. The B-mode function images the time-varying amplitude of the envelope of the signal as a gray scale. The envelope of a baseband signal is the magnitude of the vector which I and Q represent. The I,Q phase angle is not used in the B-mode display. The magnitude (i.e., intensity) of the signal is the square root of the sum of the squares of the orthogonal components, i.e., $(I^2+Q^2)^{1/2}$.

The B-mode intensity data is output to a scan converter 18 comprising a B-mode acoustic line memory followed by an X-Y display memory. The acoustic line memory accepts the processed vectors of B-mode intensity data and interpolates where necessary, and also performs the coordinate transformation of the B-mode intensity data from polar coordinate (R-θ) sector format or Cartesian coordinate linear format to appropriately scaled Cartesian coordinate display pixel intensity data, which is stored in the X-Y display memory.

The scan-converted frames are passed to a video processor 20, which converts the pixel intensity data to the video frame rate and then maps the pixel intensity data to a gray-scale mapping for video display. A conventional ultrasound imaging system typically employs a variety of gray maps, which are simple transfer functions of the raw intensity data to display gray-scale levels. The gray-scale image frames are then sent to the display monitor 22 for display.

The B-mode images displayed by monitor 22 are produced from an image frame of data in which each datum indicates the intensity or brightness of a respective pixel in the display. An image frame may, e.g., comprise a 256×256 data array in which each display pixel intensity datum is an 8-bit binary number that indicates pixel brightness. Each pixel has an intensity value which is a function of the backscatter cross section of a respective sample volume in response to interrogating ultrasonic pulses and the gray map employed. The displayed image represents the tissue and/or blood flow in a plane through the body being imaged.

Successive frames of display pixel intensity data are stored in a cine memory 24 on a first-in, first-out basis. Storage can be continuous or as a result of an external trigger event. The cine memory 24 is like a circular image buffer that runs in the back-ground, capturing image data that is displayed in real time to the user. When the user freezes the system (by operation of an appropriate device on the operator interface 28), the user has the capability to view image data previously captured in cine memory.

System control is centered in a host computer 26, which accepts operator inputs through the operator interface 28 (e.g., a control panel) and in turn controls the various subsystems. The host computer 26 performs system level control functions. A system control bus (not shown) provides the interface from the host computer to the subsystems. A scan controller (not shown) provides real-time (acoustic vector rate) control inputs to the various subsystems. The scan controller is programmed by the host computer with the vector sequences and synchronization options for acoustic frame acquisitions. Thus, the scan controller controls the beam distribution and the beam density. The scan controller transmits the beam parameters defined by the host computer to the sub-systems via a scan control bus (not shown).

Figure 2:
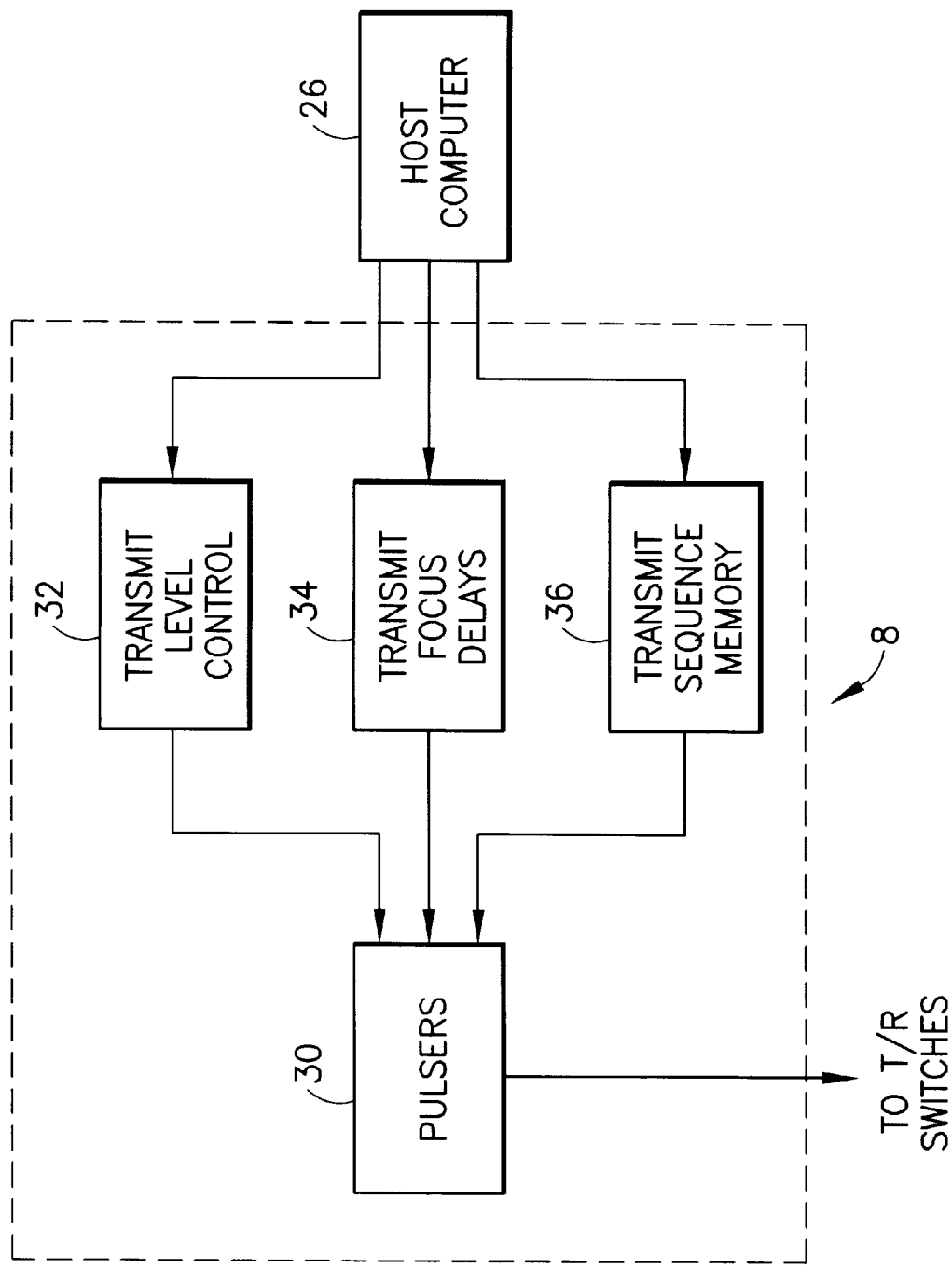
FIG. 2 is a schematic showing a block diagram of the transmitter incorporated in the system depicted in FIG. 1.

In accordance with the preferred embodiment of the invention, transmit optimization is implemented by programming a digital transmit sequence memory 36 (see FIG. 2). Each transducer element in the transmit aperture is pulsed by a pulse waveform output by a respective pulser 30 in response to a respective transmit sequence output to that pulser from the transmit sequence memory 36. The frequency and length of each pulse waveform is determined by the respective transmit sequence. For example, if the pulser 30 is bipolar, +1 and −1 elements of a transmit sequence are by transformed into pulses of opposite phase by pulser, while 0 elements correspond to no pulse. The duty cycle or pulse width is proportional to the number of consecutive +1's or −1's in the transmit sequence.

Under the direction of the host computer 26, the transmitter 8 drives the transducer array such that the ultrasonic energy is transmitted as a directed focused beam. To accomplish focusing, respective time delays are imparted to the pulsers 30 by a transmit focus delay block 34, while respective pulse amplitudes are set by transmit level control block 32. The host computer 26 determines the conditions under which the acoustic pulses will be transmitted. With this information, the transmit focus delay and transmit level control blocks will respectively determine the timing and the amplitude of each of the transmit pulses to be generated by the pulsers 30, while the frequency and length of the transmit pulses are determined by the transmit sequences.

Referring again to FIG. 1, the pulsers send the transmit pulses to each of the elements 4 of the transducer array 2 via the T/R switches 6. By appropriately adjusting the transmit focus time delays in a conventional manner, an ultrasonic beam can be directed and focused at a transmit focal position.

The automatic transmit optimization method can be implemented in software by the host computer. One key component of the method is a noise model of the entire B-mode processing chain from the beamformer through the B-mode processor to the back-end video processor. For a given position (x, y) in the B-mode image frame, the image noise model is used to predict the noise level (as a B-mode intensity or gray-scale level) at that position. For contemporary digital scanners, the image noise model consists of several key components, the details of which depend on the specific subsystem design for a particular scanner. The noise/gain calculations involved in each component are standard practices in systems design, so only the main function of each component are described in the following.

Figure 3:
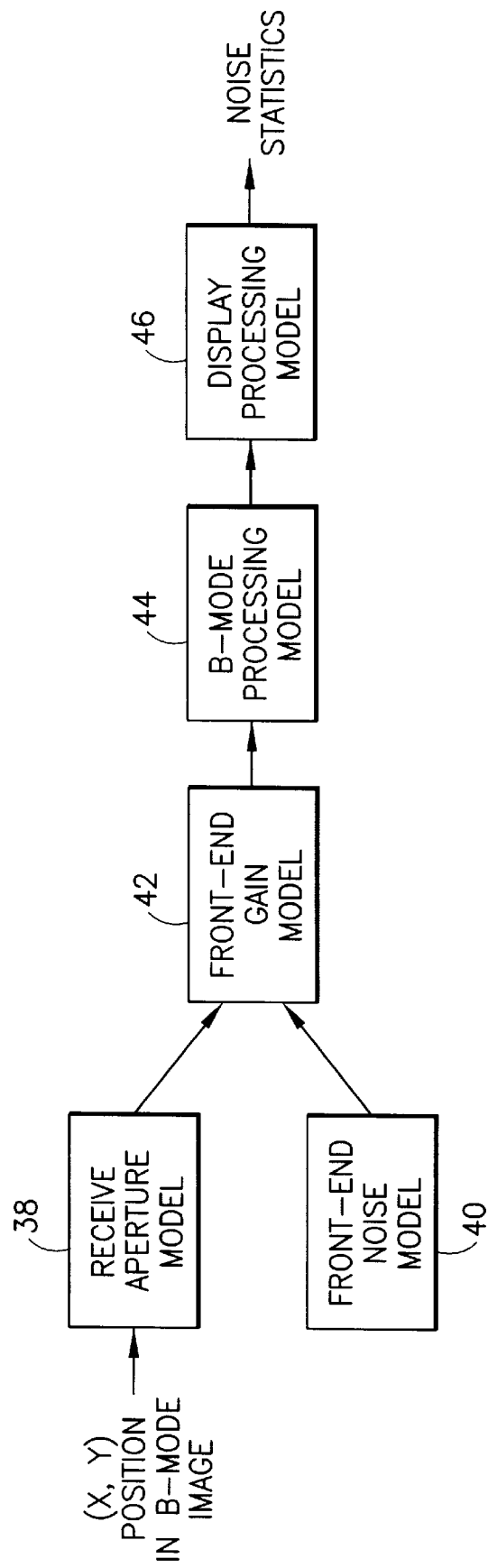
FIG. 3 is a schematic showing a block diagram of a B-mode image noise model used in performing transmit waveform (frequency/length) adjustment in accordance with the preferred embodiments of the invention.

A B-mode image noise model suitable for use in the preferred embodiment of the invention is generally depicted in FIG. 3. The front-end noise model (block 38) computes the Gaussian noise level generated by the front-end electronics (e.g., the pre-amplifier) in a single receive channel and any quantization noise associated with analog-to-digital conversion. The analog electronics noise is often referred to as thermal noise and can be calibrated accurately for a given temperature range. Depending on the electrical impedance of the transducer which is connected to the front end, the thermal noise may or may not have a flat spectral power density.

The number of receive channels contributing noise is dependent on the receive aperture size, which is computed by the receive aperture model (block 40) based on the known aperture control parameters (i.e., F number and shading) for the given probe and (x, y) position.

The front-end gain model (block 42) computes the total noise from all independent receive channels, and incorporates the effects of all filtering gains in the beamformer, including any TGC/LGC.

The B-mode processing model (block 44) adjusts the noise for the noise gains that occur in the B-mode detector and filters including scan conversion. Standard noise theory indicates that the detected envelope of Gaussian noise obeys the Rayleigh probability distribution, which is completely specified by its variance.

The display processing model (block 46) accounts for the effects of logarithmic compression and gray mapping, and outputs the predicted noise distribution at the inputted (x, y) position in the image.

The above-described noise model is run by the host computer. Prior to running the noise model, the host computer needs to read out all pertinent internal and external system settings, such as the current TGC curve, transmit focal zone positions, image depth, receive aperture, display dynamic range setting and gray mapping setting. The host computer then feeds these parameters into the various components of the image noise model.

The host computer also performs the automatic transmit optimization algorithm. It is assumed that the patient is being scanned using the default (pre-set) transmit frequency selection, which may not be optimal. The automatic transmit optimization can be activated via a single button (or softkey). The main steps in the transmit optimization algorithm in accordance with one preferred embodiment are outlined as follows.

In response to activation of the automatic transmit optimization function, the image is frozen momentarily to allow one to several most recent image frames to be saved to cine memory, which can then be read out by the host computer for analysis. If more than one is used, an average is taken to reduce statistical variations before image analysis.

Figure 4:
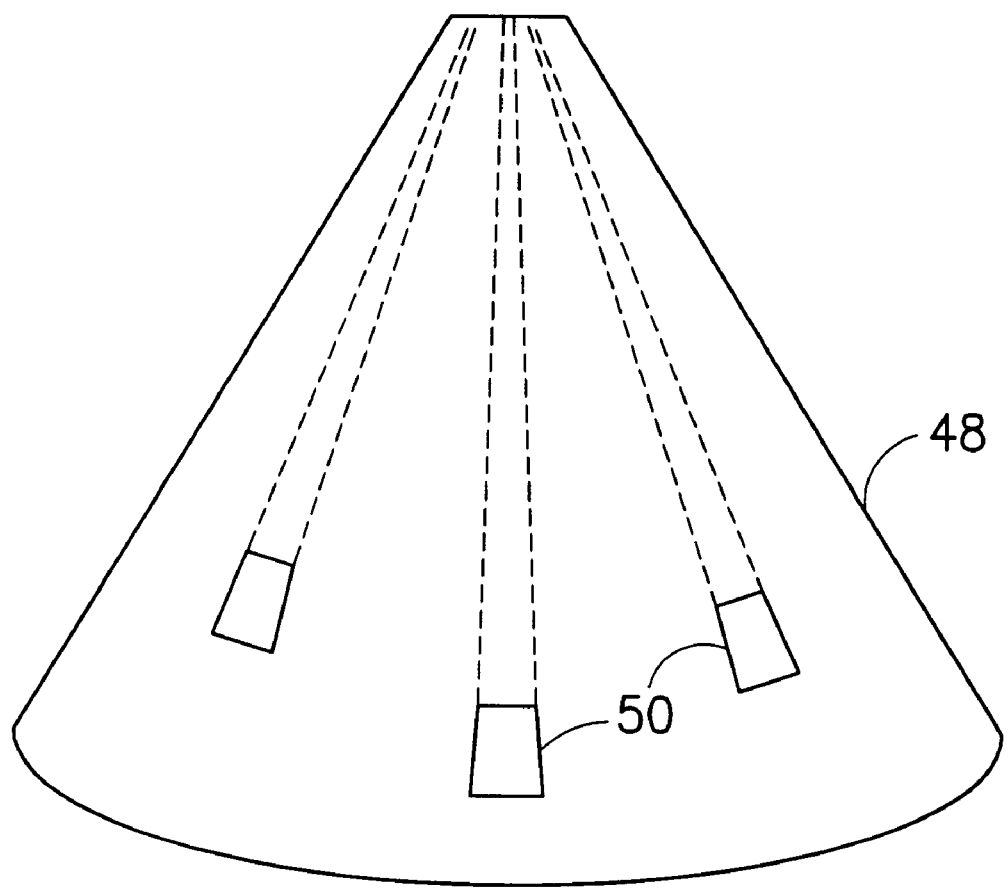
FIG. 4 is a schematic depicting a sector scan showing three test kernels spread out at different depths and angles for use in automatic transmit optimization.

The host computer then defines a number of test kernels within the image frame (single or average). FIG. 4 shows the location of test kernels 50 relative to a sector scan image 48. As seen in FIG. 4, the test kernels 50 can be placed at different positions in the image 48, with at least one close to the bottom of the image wedge. More than one test kernel is preferred since any one kernel may happen to fall within an anechoic region (cyst), which may produce a false alarm that penetration by the transmitted beam was insufficient. Each of the test kernels should be large enough (in terms of pixel count) to cover a few times the dimensions of the expected PSF inside the kernel, at about the −30 dB level. The PSF estimate can be predetermined by standard beamprofile simulations or experimental calibration. The test kernel dimensions are preferably defined by equal range and vector angle spacings for a sector or curvilinear scan (as shown in FIG. 4); the test kernels are rectangles or squares for a linear scan.

The host computer then retrieves the current settings of all pertinent gain, receive aperture and display parameters, as previously described, for each test kernel. These settings can usually be read out from other system programs or computed from known system parameters. These parameter values are input to the noise model to predict the average noise level in each test kernel.

For each test kernel, the host computer computes the average pixel intensity from the data retrieved from the cine memory. The host computer then computes the ratio of the average pixel intensity to the predicted average noise ratio for each test kernel. This gives a measure of the SNR in each test kernel.

If the SNR in a given test kernel is above a minimum acceptable threshold (e.g., 15 dB), then the host computer also computes the lateral spatial autocorrelation function for every horizontal row (for a linear scan) or every arc (for a sector or curvilinear scan) of pixels in that test kernel, and averages those values to obtain a lateral spatial correlation estimate. The host computer then determines the width of the correlation function estimate (e.g., the width at −6 dB) and compares this with the theoretical value (based on the expected PSF in the kernel). If the transmit beam has been corrupted/defocused by phase-aberrating body wall layers, the spatial correlation function estimate in the various test kernels should show a width that is significantly larger than that of the theoretical PSF. Optionally, the spatial correlation function computation can be repeated along the axial direction.

In accordance with alternative preferred embodiments, each horizontal row or arc of pixel intensities can be transformed and analyzed in the spatial frequency domain. The Fourier transform of the spatial correlation function should be identical to the power spectrum of the space-domain pixel intensities.

It is well established that the backscattered ultrasound from a random tissue scattering medium is described by a Gaussian random process which can be completely specified by its first-order statistics (i.e., amplitude statistics including mean and variance) and its second-order statistics (i.e., spatial correlation). Hence, the analyses performed by the host computer, as set forth above, provide all the data needed to gage image quality in each kernel. By applying appropriate threshold logic based on the SNR and spatial correlation widths, each of the test kernels can be classified according to a multi-tier image quality scale. An optimal transmit waveform set (for different focal zones) can be predetermined for each image quality level. Based on the combined image quality rating for all test kernels, the most suitable transmit waveform set is selected. For example, if all of the test kernels show poor SNR, then the image quality rating may be lowest, for which the lowest frequency or longest transmit waveform can be activated automatically. On the other hand, if the SNR at even the deepest test kernel is, e.g., 10 dB above the "good SNR level", a shorter transmit burst that should suffer 10 dB more attenuation loss than the current transmit waveform, can be fired automatically to maximize resolution at large depth. Alternatively, if there is only one test kernel, the optimal transmit waveform set corresponding to the image quality level of that single test kernel is selected.

The foregoing preferred embodiments have been disclosed for the purpose of illustration. Variations and modifications of the concept of the invention will be readily apparent to persons skilled in the art. For example, the automated transmit optimization function of the invention is not limited to being implemented in baseband system, but instead can be implemented in systems in which the RF signal is processed without being demodulated to baseband. Moreover, the invention is not limited to processing of display intensity data. For systems in which the acoustic or R-θ data (before scan conversion) is stored in cine memory, the automatic transmit optimization algorithm can be applied to the raw acoustic data instead of the pixel intensity data. The invention also has application in the situation where the transmit waveforms do not change for different focal zones. All such variations and modifications are intended to be encompassed by the claims set forth hereinafter.

As used in the claims, the term "acoustic data" refers to the received signal at any point between the transducer and the scan converter; and the term "pixel intensity data" refers to the scan-converted signals prior to gray mapping. The term "kernel having signal", as used in the claims, means a kernel having an average pixel intensity which is greater than the predicted average noise level for that same kernel by a predetermined quantity. It will also be appreciated that calculation of the total pixel intensity value within a kernel is the equivalent of calculation of the average pixel intensity, as recited in the claims. Finally, the phrase "as a function of", as used in the claims, is not to be construed to mean "as a function of only" what follows. For example, in accordance with the foregoing definition, the phrase "determine y as a function of x" would read on all cases where y was determined as a function of x alone or as a function of x and one or more other variables, e.g., z.

I claim:

1. A system for imaging biological tissues, comprising:
an ultrasound transducer array comprising a multiplicity of transducer elements;
a transmitter for pulsing said transducer array to transmit ultrasound beams in a first scan, said ultrasound beams of said first scan being formed using a first set of transmit waveforms;
a receiver for forming receive beams of acoustic data derived from echo signals detected by the transducer array subsequent to said transmissions;
a signal processing chain for converting said acoustic data into a set of pixel intensity data corresponding to said first scan;
a display subsystem for displaying an image representing an image frame of display data derived from said set of pixel intensity data; and
a computer programmed to perform the following steps:
(a) computing a signal-to-noise ratio and a lateral spatial autocorrelation estimate for a first test kernel of pixel intensity data extracted from said set of pixel intensity data;
(b) determining a second set of transmit waveforms as a function of said signal-to-noise ratio and said lateral spatial autocorrelation estimate of said first test kernel; and
(c) transmitting signals to said transmitter to cause said transmitter to transmit ultrasound beams formed using said second set of transmit waveforms during a second scan.

2. The system as recited in claim 1, wherein said computer computes said signal-to-noise ratio by computing an average pixel intensity for said first test kernel of pixel intensity data and computing a predicted average noise level for said first test kernel of pixel intensity data as a function of the current settings of all pertinent system parameters, said function being based on a noise model.

3. The system as recited in claim 1, wherein said computer computes said lateral spatial autocorrelation estimate by computing a spatial autocorrelation function for each lateral line of pixel intensity data in said first test kernel and then averaging the results for all lateral lines.

4. The system as recited in claim 1, wherein said step of determining a second set of transmit waveforms, performed by said computer, comprises the step of determining a width of said lateral spatial autocorrelation estimate at a predetermined level.

5. The system as recited in claim 1, wherein said step of determining a second set of transmit waveforms, performed by said computer, comprises the steps of:
(a) storing a respective optimal transmit waveform set for each image quality level of a multi-tier image quality scale;
(b) classifying said first test kernel according to said multi-tier image quality scale by assigning one of said image quality levels as a function of said signal-to-noise ratio and said lateral spatial autocorrelation estimate; and
(c) selecting the optimal transmit waveform set corresponding to said assigned image quality level.

6. The system as recited in claim 1, wherein said computer further computes an axial spatial autocorrelation estimate by computing a spatial autocorrelation function for each axial line of pixel intensity data in said first test kernel and then averaging the results for all axial lines.

7. The system as recited in claim 1, wherein said transmitter is programmed to transmit a first transmit waveform of said second set having a first center frequency which is focused in a first transmit focal zone, and a second transmit waveform of said second set having a second center frequency different than said first frequency which is focused in a second transmit focal zone different than said first transmit focal zone.

8. The system as recited in claim 1, wherein said transmitter is programmed to transmit a first transmit waveform of said second set having a first length which is focused in a first transmit focal zone, and a second transmit waveform of said second set having a second length different than said first length which is focused in a second transmit focal zone different than said first transmit focal zone.

9. The system as recited in claim 1, wherein said computer is further programmed to perform the step of computing a signal-to-noise ratio and a lateral spatial autocorrelation estimate for additional test kernels of pixel intensity data extracted from said set of pixel intensity data, said second set of transmit waveforms being determined as a function of the signal-to-noise ratios and the lateral spatial autocorrelation estimates for all test kernels.

10. The system as recited in claim 9, wherein said step of determining a second set of transmit waveforms, performed by said computer, comprises the steps of:
(a) storing a respective optimal transmit waveform set for each image quality level of a multi-tier image quality scale;
(b) classifying all test kernels according to said multi-tier image quality scale by assigning a respective image quality level to each test kernel as a function of said signal-to-noise ratios and said lateral spatial autocorrelation estimates; and
(c) selecting an optimal transmit waveform set based on a combined image quality rating for all test kernels.

11. A system for imaging biological tissues, comprising:
an ultrasound transducer array comprising a multiplicity of transducer elements;
a transmitter for pulsing said transducer array to transmit ultrasound beams in successive scans;
a receiver for forming receive beams of acoustic data derived from echo signals detected by the transducer array subsequent to said transmissions;
a signal processing chain for converting said acoustic data into respective sets of pixel intensity data corresponding to said scans;
a display subsystem for displaying respective images representing respective image frames of display data derived from said respective sets of pixel intensity data; and
a computer programmed to perform the following steps:
(a) computing a signal-to-noise ratio and a lateral spatial autocorrelation estimate for each one of a plurality of test kernels of pixel intensity data extracted from an average of said respective sets of pixel intensity data;
(b) determining a second set of transmit waveforms as a function of said signal-to-noise ratios and said lateral spatial autocorrelation estimates; and
(c) transmitting signals to said transmitter to cause said transmitter to transmit ultrasound beams formed using said second set of transmit waveforms during a second scan.

12. The system as recited in claim 11, wherein said computer computes said signal-to-noise ratio by computing an average pixel intensity for each test kernel of averaged pixel intensity data and computing a predicted average noise level for each test kernel of averaged pixel intensity data as a function of the current settings of all pertinent system parameters, said function being based on a noise model.

13. The system as recited in claim 11, wherein said computer computes a lateral spatial autocorrelation estimate for each test kernel by computing a spatial autocorrelation function for each lateral line of averaged pixel intensity data in said respective test kernel and then averaging the results for all lateral lines.

14. The system as recited in claim 11, wherein said step of determining a second set of transmit waveforms, performed by said computer, comprises the step of determining a width of said lateral spatial autocorrelation estimate at a predetermined level for each test kernel.

15. The system as recited in claim 11, wherein said step of determining a second set of transmit waveforms, performed by said computer, comprises the steps of:
   (a) storing a respective optimal transmit waveform set for each image quality level of a multi-tier image quality scale;
   (b) classifying each of said test kernels according to said multi-tier image quality scale by assigning one of said image quality levels to each test kernel as a function of said respective signal-to-noise ratio and said respective lateral spatial autocorrelation estimate; and
   (c) selecting the most suitable of said optimal transmit waveform sets based on a combined image quality rating for all test kernels.

16. A method for automatically optimizing a transmit waveform in an ultrasound imaging system, comprising the steps of:
   (a) transmitting ultrasound beams formed using a non-optimal set of transmit waveforms during a first scan;
   (b) acquiring an image frame of pixel intensity data during said first scan;
   (c) selecting a first test kernel in said image frame of pixel intensity data;
   (d) computing a signal-to-noise ratio for said first test kernel of pixel intensity data;
   (e) computing a lateral spatial autocorrelation estimate for said first test kernel of pixel intensity data;
   (f) determining an optimal set of transmit waveforms as a function of said signal-to-noise ratio and said lateral spatial autocorrelation estimate of said first test kernel; and
   (g) transmitting ultrasound beams formed using said optimal set of transmit waveforms during a second scan.

17. The method as recited in claim 16, further comprising the step of retrieving the current settings in said ultrasound imaging system of all pertinent system parameters, wherein said step of computing a signal-to-noise ratio comprises the steps of:
   computing an average pixel intensity for said first test kernel of pixel intensity data; and
   computing a predicted average noise level for said first test kernel of pixel intensity data as a function of the current settings of all pertinent system parameters, said function being based on a noise model.

18. The method as recited in claim 16, wherein said lateral spatial autocorrelation estimate is computed by computing a spatial autocorrelation function for each lateral line of pixel intensity data in said first test kernel and then averaging the results for all lateral lines.

19. The method as recited in claim 16, wherein said step of determining an optimal set of transmit waveforms comprises the step of determining a width of said lateral spatial autocorrelation estimate at a predetermined level.

20. The method as recited in claim 16, wherein said step of determining a second set of transmit waveforms comprises the steps of:
   (a) storing a respective optimal transmit waveform set for each image quality level of a multi-tier image quality scale;
   (b) classifying said first test kernel according to said multi-tier image quality scale by assigning one of said image quality levels as a function of said signal-to-noise ratio and said lateral spatial autocorrelation estimate; and
   (c) selecting the optimal transmit waveform set corresponding to said assigned image quality level.

21. The method as recited in claim 16, further comprising the steps of computing an axial spatial autocorrelation estimate by computing a spatial autocorrelation function for each axial line of pixel intensity data in said first test kernel and then averaging the results for all axial lines.

22. The method as recited in claim 16, wherein said step of transmitting ultrasound beams formed using said optimal set of transmit waveforms during a second scan comprises the steps of:
   transmitting a first transmit waveform of said second set having a first center frequency which is focused in a first transmit focal zone; and
   transmitting a second transmit waveform of said second set having a second center frequency different than said first center frequency which is focused in a second transmit focal zone different than said first transmit focal zone.

23. The method as recited in claim 16, wherein said step of transmitting ultrasound beams formed using said optimal set of transmit waveforms during a second scan comprises the steps of:
   transmitting a first transmit waveform of said second set having a first length which is focused in a first transmit focal zone; and
   transmitting a second transmit waveform of said second set having a second length different than said first length which is focused in a second transmit focal zone different than said first transmit focal zone.

24. The method as recited in claim 16, further comprising the step of computing a signal-to-noise ratio and a lateral spatial autocorrelation estimate for additional test kernels of pixel intensity data extracted from said set of pixel intensity data, said second set of transmit waveforms being determined as a function of the signal-to-noise ratios and the lateral spatial autocorrelation estimates for all test kernels.

25. The method as recited in claim 24, wherein said step of determining a second set of transmit waveforms comprises the steps of:
   (a) storing a respective optimal transmit waveform set for each image quality level of a multi-tier image quality scale;
   (b) classifying all test kernels according to said multi-tier image quality scale by assigning a respective image quality level to each test kernel as a function of said signal-to-noise ratios and said lateral spatial autocorrelation estimates; and
   (c) selecting an optimal transmit waveform set based on a combined image quality rating for all test kernels.

26. A method for automatically optimizing a transmit waveform in an ultrasound imaging system, comprising the steps of:

(a) transmitting ultrasound beams formed using a non-optimal set of transmit waveforms during n scans, where n is an integer and n>1;

(b) acquiring n image frames of pixel intensity data during said n scans;

(c) averaging said n image frames of pixel intensity data to form an image frame of averaged pixel intensity data;

(d) selecting a first test kernel in said image frame of averaged pixel intensity data;

(e) computing a signal-to-noise ratio for said first test kernel of averaged pixel intensity data;

(f) computing a lateral spatial autocorrelation estimate for said first test kernel of averaged pixel intensity data;

(g) determining an optimal set of transmit waveforms as a function of said signal-to-noise ratio and said lateral spatial autocorrelation estimate of said first test kernel; and (h) transmitting ultrasound beams formed using said optimal set of transmit waveforms during an (n+1)-th scan.

27. A system for imaging biological tissues, comprising:

an ultrasound transducer array comprising a multiplicity of transducer elements;

a transmitter for pulsing said transducer array to transmit ultrasound beams in a first scan, said ultrasound beams of said first scan being formed using a first set of transmit waveforms;

a receiver for forming receive beams of acoustic data derived from echo signals detected by the transducer array subsequent to said transmissions;

a signal processing chain for converting said acoustic data into a set of pixel intensity data corresponding to said first scan;

a display subsystem for displaying an image representing an image frame of display data derived from said set of pixel intensity data; and a computer programmed to perform the following steps:
  (a) computing a signal-to-noise ratio for a test kernel of pixel intensity data extracted from said set of pixel intensity data;
  (b) determining a second set of transmit waveforms as a function of said signal-to-noise ratio of said test kernel; and
  (c) transmitting signals to said transmitter to cause said transmitter to transmit ultrasound beams formed using said second set of transmit waveforms during a second scan.

28. The system as recited in claim 27, wherein said computer computes said signal-to-noise ratio by computing an average pixel intensity for said test kernel of pixel intensity data and computing a predicted average noise level for said test kernel of pixel intensity data as a function of the current settings of all pertinent system parameters, said function being based on a noise model.

29. A system for imaging biological tissues, comprising:

an ultrasound transducer array comprising a multiplicity of transducer elements;

a transmitter for pulsing said transducer array to transmit ultrasound beams in successive scans;

a receiver for forming receive beams of acoustic data derived from echo signals detected by the transducer array subsequent to said transmissions;

a signal processing chain for converting said acoustic data into respective sets of pixel intensity data corresponding to said scans;

a display subsystem for displaying respective images representing respective image frames of display data derived from said respective sets of pixel intensity data; and a computer programmed to perform the following steps:
  (a) computing a signal-to-noise ratio for each one of a plurality of test kernels of pixel intensity data extracted from an average of said respective sets of pixel intensity data;
  (b) determining a second set of transmit waveforms as a function of said signal-to-noise ratios; and
  (c) transmitting signals to said transmitter to cause said transmitter to transmit ultrasound beams formed using said second set of transmit waveforms during a second scan.

30. The system as recited in claim 29, wherein said computer computes said signal-to-noise ratio by computing an average pixel intensity for each test kernel of averaged pixel intensity data and computing a predicted average noise level for each test kernel of averaged pixel intensity data as a function of the current settings of all pertinent system parameters, said function being based on a noise model.

31. A method for automatically optimizing a transmit waveform in an ultrasound imaging system, comprising the steps of:

(a) transmitting ultrasound beams formed using a non-optimal set of transmit waveforms during a first scan;

(b) acquiring an image frame of pixel intensity data during said first scan;

(c) selecting a test kernel in said image frame of pixel intensity data;

(d) computing a signal-to-noise ratio for said test kernel of pixel intensity data;

(e) determining an optimal set of transmit waveforms as a function of said signal-to-noise ratio of said test kernel; and (f) transmitting ultrasound beams formed using said optimal set of transmit waveforms during a second scan.

32. The method as recited in claim 31, further comprising the step of retrieving the current settings in said ultrasound imaging system of all pertinent system parameters, wherein said step of computing a signal-to-noise ratio comprises the steps of:

computing an average pixel intensity for said test kernel of pixel intensity data; and computing a predicted average noise level for said test kernel of pixel intensity data as a function of the current settings of all pertinent system parameters, said function being based on a noise model.

33. A method for automatically optimizing a transmit waveform in an ultrasound imaging system, comprising the steps of:

(a) transmitting ultrasound beams formed using a non-optimal set of transmit waveforms during n scans, where n is an integer and n>1;

(b) acquiring n image frames of pixel intensity data during said n scans;

(c) averaging said n image frames of pixel intensity data to form an image frame of averaged pixel intensity data;

(d) selecting a test kernel in said image frame of averaged pixel intensity data;

(e) computing a signal-to-noise ratio for said test kernel of averaged pixel intensity data;

(f) determining an optimal set of transmit waveforms as a function of said signal-to-noise ratio of said test kernel; and (g) transmitting ultrasound beams formed using said optimal set of transmit waveforms during an (n+1)-th scan.

34. The method as recited in claim 33, further comprising the step of retrieving the current settings in said ultrasound imaging system of all pertinent system parameters, wherein said step of computing a signal-to-noise ratio comprises the steps of:

computing an average pixel intensity for said test kernel of averaged pixel intensity data; and computing a predicted average noise level for said first test kernel of averaged pixel intensity data as a function of the current settings of all pertinent system parameters, said function being based on a noise model.

* * * * *